(12) United States Patent
Zhai et al.

(10) Patent No.: US 10,070,100 B2
(45) Date of Patent: Sep. 4, 2018

(54) IMAGING SERVICE USING OUTDOOR LIGHTING NETWORKS

(75) Inventors: Hongqiang Zhai, Jersey City, NJ (US); Kiran Srinivas Challapali, New City, NY (US); Dave Alberto Tavares Cavalcanti, Mahopac, NY (US); Jianfeng Wang, Ossining, NY (US)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 380 days.

(21) Appl. No.: 14/238,275

(22) PCT Filed: Sep. 13, 2012

(86) PCT No.: PCT/IB2012/054767
§ 371 (c)(1),
(2), (4) Date: Feb. 11, 2014

(87) PCT Pub. No.: WO2013/042017
PCT Pub. Date: Mar. 28, 2013

(65) Prior Publication Data
US 2014/0198216 A1 Jul. 17, 2014

Related U.S. Application Data

(60) Provisional application No. 61/537,945, filed on Sep. 22, 2011.

(51) Int. Cl.
*H04N 7/18* (2006.01)
*H05B 37/02* (2006.01)
(52) U.S. Cl.
CPC ......... *H04N 7/181* (2013.01); *H05B 37/0245* (2013.01)

(58) Field of Classification Search
CPC ..... H04N 7/181; H05B 37/0245; Y02B 20/72
USPC ................................ 348/143, 152, 153, 159
See application file for complete search history.

(56) References Cited

U.S. PATENT DOCUMENTS

| | | | | |
|---|---|---|---|---|
| 6,529,137 | B1 * | 3/2003 | Roe .................. | G08B 25/14 340/525 |
| 6,807,360 | B1 * | 10/2004 | Imai .................. | H04N 7/181 348/143 |
| 8,665,333 | B1 * | 3/2014 | Sharma .............. | G06K 9/00771 348/135 |
| 2003/0025599 | A1 * | 2/2003 | Monroe ........... | G08B 13/19602 340/531 |

(Continued)

FOREIGN PATENT DOCUMENTS

| | | |
|---|---|---|
| CN | 1622622 A | 6/2005 |
| CN | 1852428 A | 10/2006 |

(Continued)

*Primary Examiner* — Francis G Geroleo

(57) ABSTRACT

A system and methods to provide imaging service using outdoor lighting networks. The system uses outdoor lighting networks to manage/control video/image sensors connected to the network, e.g. hosted at lighting units, and coordinates the capture of useful video/image data associated with events. The system also provides an information search platform for users to retrieve only the relevant video/image data associated with events of interest. Furthermore, the system controls when and how to retrieve video/image data at lighting units across the whole network according to user requests, the priority of the events, and available bandwidth.

15 Claims, 5 Drawing Sheets

(56) References Cited

U.S. PATENT DOCUMENTS

| | | | |
|---|---|---|---|
| 2003/0044168 A1* | 3/2003 | Matsukawa | G08B 13/19641 386/223 |
| 2003/0067542 A1* | 4/2003 | Monroe | H04N 7/181 348/148 |
| 2003/0097532 A1* | 5/2003 | Montgomery | G08B 13/19669 711/154 |
| 2004/0008253 A1* | 1/2004 | Monroe | G08B 13/19641 348/143 |
| 2004/0080615 A1* | 4/2004 | Klein | G08B 13/19669 348/143 |
| 2006/0077053 A1* | 4/2006 | Park | G08B 25/08 340/521 |
| 2006/0078047 A1* | 4/2006 | Shu | G06F 17/3079 375/240.01 |
| 2006/0253885 A1 | 11/2006 | Murphy et al. | |
| 2007/0013776 A1* | 1/2007 | Venetianer | G06K 9/00771 348/143 |
| 2010/0029268 A1* | 2/2010 | Myer | F21S 2/00 455/426.1 |
| 2010/0262296 A1 | 10/2010 | Davis et al. | |
| 2010/0262297 A1 | 10/2010 | Shloush et al. | |
| 2011/0013018 A1* | 1/2011 | Leblond | G06T 17/05 348/143 |
| 2011/0046920 A1 | 2/2011 | Amis | |
| 2011/0127916 A1* | 6/2011 | Kim | H05B 37/00 315/130 |
| 2011/0134239 A1 | 6/2011 | Vadai et al. | |
| 2012/0038281 A1* | 2/2012 | Verfuerth | H05B 37/0272 315/152 |
| 2012/0040606 A1* | 2/2012 | Verfuerth | H05B 37/0218 455/7 |
| 2012/0044350 A1* | 2/2012 | Verfuerth | H05B 37/0272 348/143 |
| 2013/0257284 A1* | 10/2013 | VanWagoner | H05B 37/0245 315/131 |

FOREIGN PATENT DOCUMENTS

| | | |
|---|---|---|
| EP | 2020828 A2 | 4/2009 |
| JP | 2002330400 A | 11/2002 |
| JP | 2003346262 A | 12/2003 |
| JP | 2005025533 A | 1/2005 |
| JP | 2007134934 A | 5/2007 |
| JP | 2007267332 A | 10/2007 |
| JP | 2007299381 A | 11/2007 |
| JP | 2010258540 A | 11/2010 |
| JP | 2011141787 A | 7/2011 |
| WO | 2010018887 A1 | 2/2010 |

* cited by examiner

IMAGING SERVICE USING OUTDOOR LIGHTING NETWORKS

This application is the U.S. National Phase application under 35 U.S.C. § 371 of International Application No. PCT/2012/054767, filed on Sep. 13, 2012 which claims the benefit of U.S. Provisional Patent Application No. 61/537,945, filed on Sep. 22, 2011. These applications are hereby incorporated by reference herein.

This invention relates to a system and method for providing image and or video information from multiple lighting system/camera installations in a large scale outdoor environment.

Surveillance plays an increasingly important role in various outdoor environments, such as monitoring traffic and environmental conditions, improving safety, and responding to emergencies. Typically, surveillance cameras generate video and image data, which can be either stored locally or be transmitted to remote servers through communication networks. Among the surveillance data, emergency videos and images are often required to be delivered to responders and security personnel in real time.

Real-time monitoring as well as "after the fact" capture of video/image data has many useful applications from monitoring places with strict security requirements to providing a sense of safety and security in public spaces, e.g. parks, roadways, etc. However setting up a ubiquitous infrastructure for video monitoring is a huge task. One of the main challenges is the cost of installing a dedicated infrastructure (e.g. cabling/fiber deployment, equipment, maintenance, . . . ). Additional costs are involved for real-time monitoring and streaming of video/image data. Moreover, prior art systems require high bandwidth capacity. This is a challenge for current network technologies, especially when the target areas are large scale outdoor environments.

While wireless systems exist, limited communication bandwidth provided by the current wireless network technologies is a significant bottleneck for covering large areas. Therefore, most existing systems are deployed only in critical areas, i.e., mainly where security concerns justify the high deployment and maintenance costs. Most video/image data recorded at outdoor cameras are likely not useful and hence streaming the data to a remote monitoring center is not a good way to use the already scarce communication bandwidth. On the other hand, locally storing and later recovering the imaging data from every device is an alternative for a limited number of devices, but it becomes inefficient for a large installed base (e.g. across a downtown area in a large city). The key problem is to be able to efficiently capture, store and recover only the most relevant information while covering very large areas.

Outdoor lighting poles are natural choices to place surveillance cameras to monitoring streets, parking lots, parks, and other outdoor areas. Outdoor lighting networks (OLN) exist that are used to control and manage outdoor lighting units. OLNs can be also used to transmit the data from cameras installed on lighting poles to monitoring centers. Thus, utilizing OLNs has the potential of significantly reducing the cost of implementing a surveillance network for a large scale environment.

However, currently, imaging data are usually transmitted over a dedicated network, due to the high capacity required and relatively low bandwidth available in OLN. Communication technologies used by OLN include ZigBee, WiFi, cellular (GPRS, 3G/4G), and power line communication networks, which normally have limited bandwidth.

This invention addresses these various problems in the prior art by using the ubiquitous outdoor lighting devices (lighting units) connected as an OLN to manage the capture, storage and retrieval of image data that is associated with relevant events, such as emergency situations, traffic accidents, etc.

In one embodiment of the invention each lighting unit (LU) includes lamps, video/image sensors, data storage, and communication and control modules that are connected with a lighting manager directly or through other lighting units. A lighting unit may also include an occupancy sensor and/or other sensors, such as photocell and environmental sensors.

In addition to an OLN system database, the lighting manager maintains an imaging database to store information about imaging data associated with events that are captured by imaging devices and LUs in the field. Each entry in the database may include time, location, lighting unit identification, download status, and event specific information (type, priority level) associated with the video/image data. The imaging data (e.g. video, picture, etc) for each entry is either stored in the database or only partial information about the data and associated event is stored in the database, while the whole imaging data may still be at imaging devices and lighting units in the field. In a further embodiment, the imaging data is also marked as "Downloaded" if an authorized user went to the storage devices in the field and downloaded the data to his or her devices.

The lighting manager guides imaging devices at lighting units as to when to record/capture data and how to retrieve the data.

In one embodiment, users (or the system administrator) could set a default operation mode at the lighting manager for the imaging data collection and retrieval from sensors and lighting unit at selected areas for one or more certain periods of time.

In an additional embodiment, the system could be set up for video/image sensors in a certain area to constantly record imaging data for a period of time.

In a further embodiment, a video/image sensor only starts to record imaging data for a certain period of time when certain events happen. By way of example, such triggering events may include:

- sensors on LUs detect any one of a set of predefined events, such as movements from car and/or pedestrian, smoke detected by a smoke sensor, DUI (driving under influence) detected by alcohol sensor;
- LUs receive signals from cars (e.g. through a radio, e.g. DSRC) which indicate certain safety events, such as that two cars are too close to each other or there is a collision;
- Authorized users like police send request to control lighting performance (e.g. illumination level and light colors) and use the imaging service for emergency situations such as chasing speeding cars and car accidents;
- A person with an emergent health condition that needs life critical instructions from a remote support before an ambulance vehicle arrives (e.g. an alert signal from the person's health monitoring device);
- If a LU is in an abnormal status, the lighting manager sends request to neighboring LUs to obtain imaging data of the LU to help with any diagnostics.

In another embodiment, a video/image sensor records imaging data either with low quality constantly or at certain time instants; it resumes normal recording with higher quality either when the above events happen or video analysis based on available video/image data indicates the possibility of some of these events.

In one example, when police are chasing a suspect car on the road at night, the police may request emergency lighting on the road, such as higher illuminance level, flashing lamps, and yellow, blue or red light colors. The police coordination center may also need imaging data of the area to help coordinate the operation, e.g. follow the car and block the car in all possible directions. Upon receiving the user request, the lighting manager identifies the event and sends a command to the imaging devices at lighting units in the given area to adjust the lighting attributes as required (e.g., to improve image capture) and to start recording imaging data at these lighting units. The selected data can also be transmitted to one or more users through the OLN. When the event finishes, the police stop monitoring the imaging data and send a request to resume normal lighting attributes at those lighting units. The lighting manager then sends a command to the lighting units to resume normal operations of lighting control and imaging devices.

In another example, vehicles can detect distance between themselves by using radios, such as DSRC (Dedicated Short-Range Communications). Lighting units are equipped with communication devices which can receive information sent from radios in vehicles. When lighting units detect from vehicle messages that a safety condition is about to occur or has occurred (e.g. two or more cars are very close to each other or there is a vehicle collision), the lighting units can start recording the imaging data immediately, which can be retrieved by police later. If there are no further related radio messages after a predefined length of period, the imaging devices resume their normal operations.

In another example, when an occupancy or motion sensor on a lighting unit detects movement from a car or a pedestrian in a certain areas, the lighting illuminance level is increased to provide better lighting or alert the car or the pedestrian. Upon increasing the lighting illuminance level due to the movement detection, the lighting unit also starts to record the video/image data using the video/camera sensor if the sensor is not recording the video/image data with normal quality already. If the occupancy sensor at the lighting unit detects that there is no movement around or the car or the pedestrian has already left the area close to the lighting unit, the lighting unit decreases the lighting illuminance level to save energy. Upon decreasing the lighting illuminance level due to no detected movement, the lighting unit stops recording the video/image data with normal quality. That is, by way of example, the lighting unit adopts a routine operation method in which recording the video/image data resumes with low quality or at low frequency.

As an additional refinement to the above example, advanced imaging sensors or a combination of data from multiple sensors can also be used to distinguish between objects or identify unusual patterns that could trigger the image recording. For example, sensors detect movements in several directions approaching a pedestrian in the middle of the night, and then trigger the lighting and camera. The use of the present invention for pedestrian traffic also has potential uses in both day and nightime monitoring of vehicles' failure to yield to pedestrians in crosswalks. This ability has significant potential in accident investigation as well as enforcement of crosswalk laws. In the latter situation, summonses potentially could be issued from the recorded information.

In various embodiments of the invention, a lighting unit marks the recorded imaging data with the event information associated with the data. It can also assign a priority to the data according to the event type. The rule of setting the priority according to the event type is typically set by the lighting manager, for example, based on user preferences or policies defined by the city administrators. That is, the lighting manager sends the rule(s) to lighting units, which set priority of recorded imaging data accordingly. For example, the life critical information, including emergent health issue(s) after a car accident, can be assigned with the highest priority; crime scene, such as police chasing speeding cars and nearby outdoor areas around an ongoing bank robbery, can be assigned with the second highest priority; car collision information, e.g. obtained by radios in cars or mobile users, can be assigned with the third highest priority.

In another example, the lighting manager sets the priority based on the data received from the lighting units (e.g., type of object detected, processing of a partial image, etc). These examples only illustrate possible ways to assign priorities to different events. Further, the priority setting rule can be also dynamically changed by authorized users, such as police or city administrators through the lighting manager.

In general, the various aspects of the invention may be combined and coupled in any way possible within the scope of the invention. The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

Figure 1:
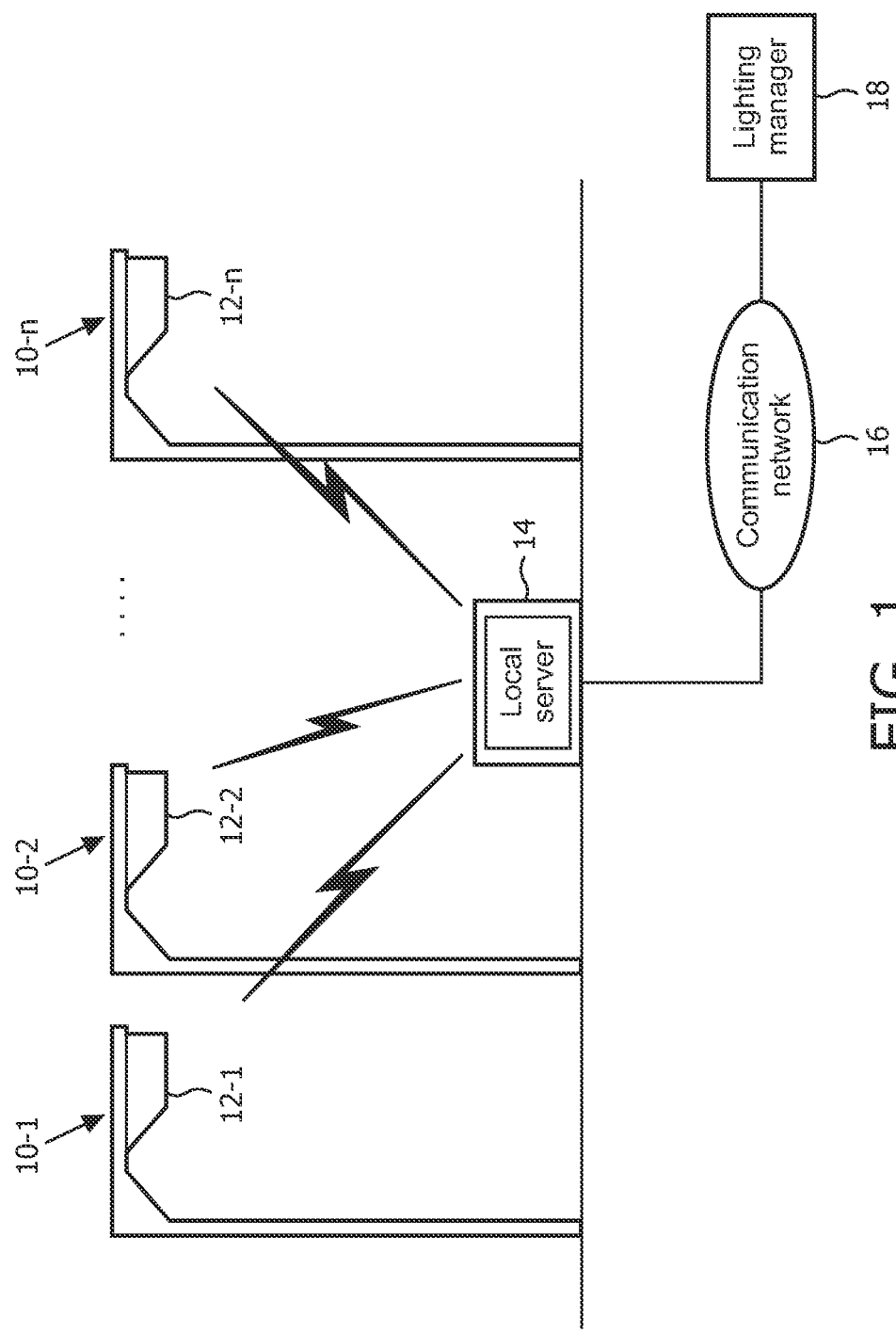
FIG. 1 is a block diagram of a surveillance system using camera-attachable streetlights according to an exemplary embodiment of the present invention.

FIG. 1 is a block diagram of a surveillance system using camera-attachable streetlights according to an exemplary embodiment of the present invention. Referring to FIG. 1, the surveillance system includes lighting units 12-1 to 12-*n* installed in a plurality of streetlights 10-1 to 10-*n*. According to the present invention, each of the lighting units 12-1 to 12-*n* includes one or more lighting elements and a camera module for capturing its installation area. In an alternative embodiment, the camera module need not be integrated into the lighting unit, but rather be another wireless or wired device in the OLN that can communicate with one or more lighting units and/or with the light manager. In further embodiments, the lighting units do not always have to directly communicate with the local server—that is, they may also form a mesh network, where lighting units use other nearby lighting units to communicate with the local server.

Figure 2:
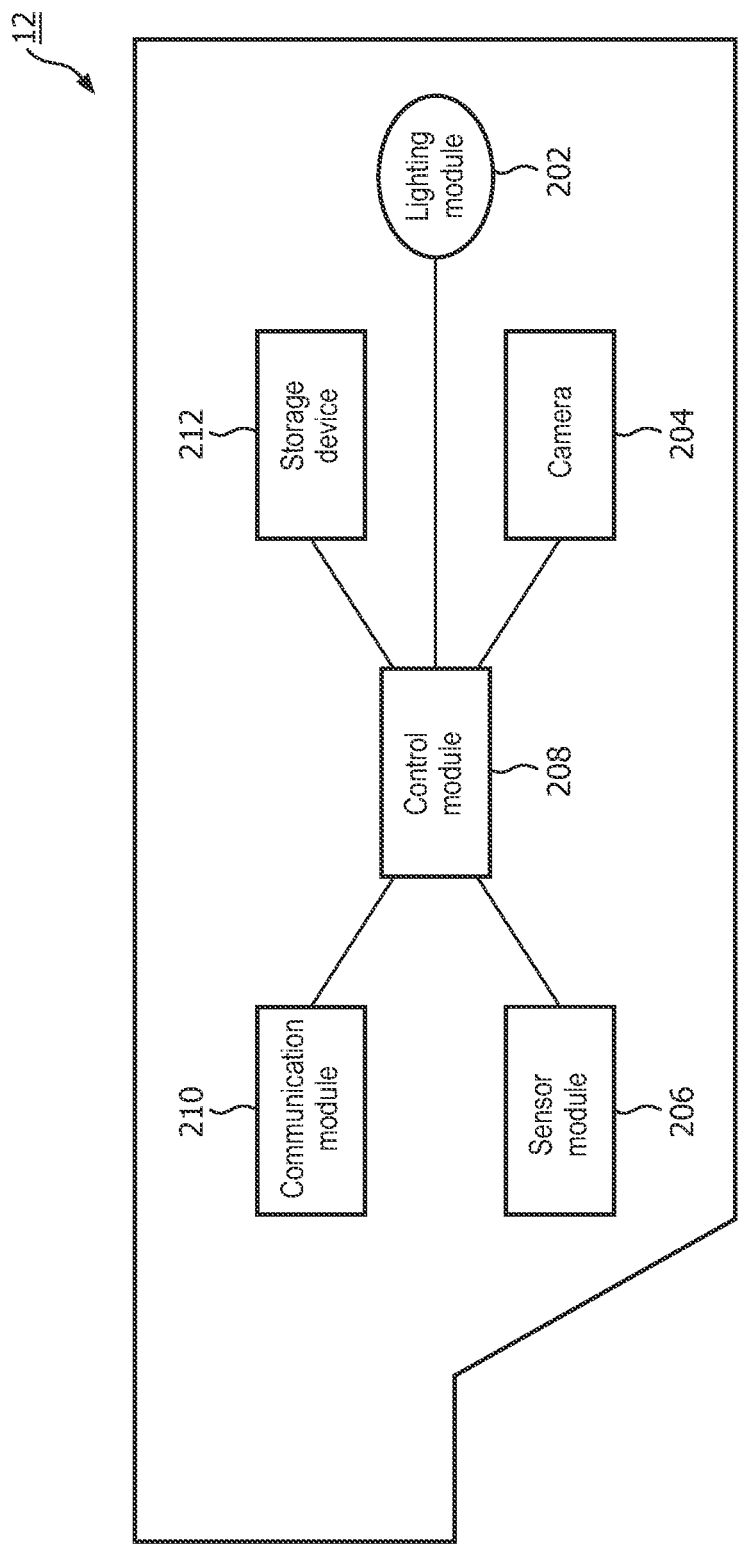
FIG. 2 is a block diagram of a lighting unit for a camera-attachable streetlight according to an exemplary embodiment of the present invention.

FIG. 2 is a block diagram of a lighting unit 12 for a camera-attachable streetlight according to an exemplary embodiment of the present invention. Referring to FIG. 2, the lighting unit 12 includes a lighting module 202 which contains one or more bulbs, light emitting diodes, or other types of lighting devices as are well-known in the art.

Lighting unit 12 further includes one or more cameras 204 for capturing images. Such cameras may include still photographer, infra-red, and conventionial video cameras with varying levels of picture quality (also referred to herein as "imaging devices" or "cameras"). A storage device 212 is provided for recording said captured images. In addition a communication module 210 permits communication over a communication network 16 with a lighting manager directly or through other lighting units. As noted above, the camera may be separated from the lighting unit as long as it is capable of commuicating with the light manager. This applies to the local storage device 212 as well. This potential for separating various components from the lighting unit applies to each of the embodiments described below.

Returning to FIG. 1, it is shown that the communication network comprises communication with a local server 14 and a central server. Further, while FIG. 1 illustrates wireless communication with lighting units 12, it should be noted that the invention is not limited to this embodiment as other types of communication are contemplated by the invention.

A lighting manager guides cameras and sensors at lighting units 12 as to when to record/capture data and how to retrieve data. FIG. 1 depicts one such lighting manager 18 located at a central location (e.g. within a central server). The invention is not limited to this embodiment. By way of example, for larger networks there may a central lighting manager residing in a remote location over the communication network 16 that distributes its functionality to sub-managers provided in local servers 14. In such a situation, it is only these sub-managers that communicate directly with the lighting units 14 in its group. By way of a further example, there are contemplated embodiments of the invention in which there is no local server. In this situation the communication module of the lighing unit communicates directly over the communication network 16.

Figure 3:
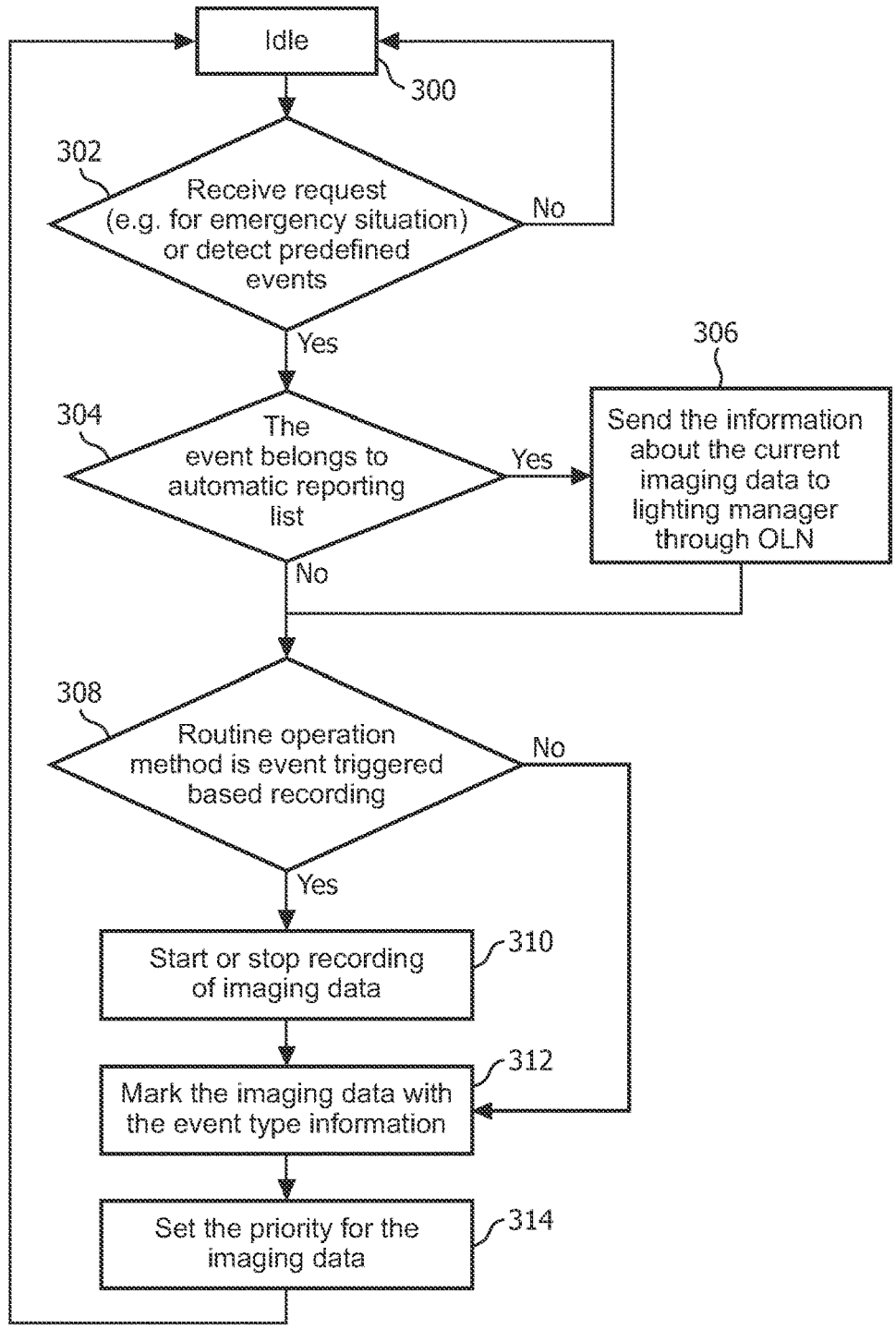
FIG. 3 is a flow chart which summarizes the event processing procedure at lighting units according to an exemplary embodiment of the present invention.

This functionality of the lighting manager and the lighting units themselves will now be discussed with respect to FIG. 3. FIG. 3 is a flow chart which summarizes the event processing procedure at lighting units according to an exemplary embodiment of the present invention. As depicted in step 302, a lighting unit 12 remains in an idle state 300 until it detects a predefined event or receives a request (step 302). Then if the detected event belongs to "an automatic reporting list" (step 304), the appropriate data is sent to the lighting manager through the OLN (step 306). If the operation method relates to an event triggered situation, the recording of imaging data is started or stopped accordingly (step 310). In any event, the image data is then marked with event type information (step 312) and a priority is assigned (step 314).

The lighting unit 12 reports the information about the recorded data to the lighting manager through the OLN. The information may include timestamp, lighting unit identification, location of lighting unit and/or event, event type, and length and storage size of the data. As illustrated in step 304, a lighting unit only automatically reports imaging data associated with certain event types when the event happens, which is guided by the lighting manager. In other words, the lighting manager sends a request including a list of event types to lighting units for which to automatically report the information when events with the types in the given list happen at that lighting unit.

The light manager may also request a report including imaging data and associated event(s) from a LU at any time, for instance when a request is received from one or more of the users. A lighting unit sends back the information including timestamp, LU identification, event type, and length and storage size of the video/image data to the lighting manager through OLN.

The lighting manager updates the imaging database after receiving imaging data information reports from lighting units.

In one embodiment of the invention, if the imaging data is transmitted to the lighting manager, the data can be safely deleted at the storage device at the lighting unit(s). If the data is downloaded locally at the lighting units by an authorized user such as police, the data can be safely deleted or possibly set with a lower priority and a downloaded flag. The user can interact with the lighting manager to provide the preferred mode to receive/view the data.

Figure 4:
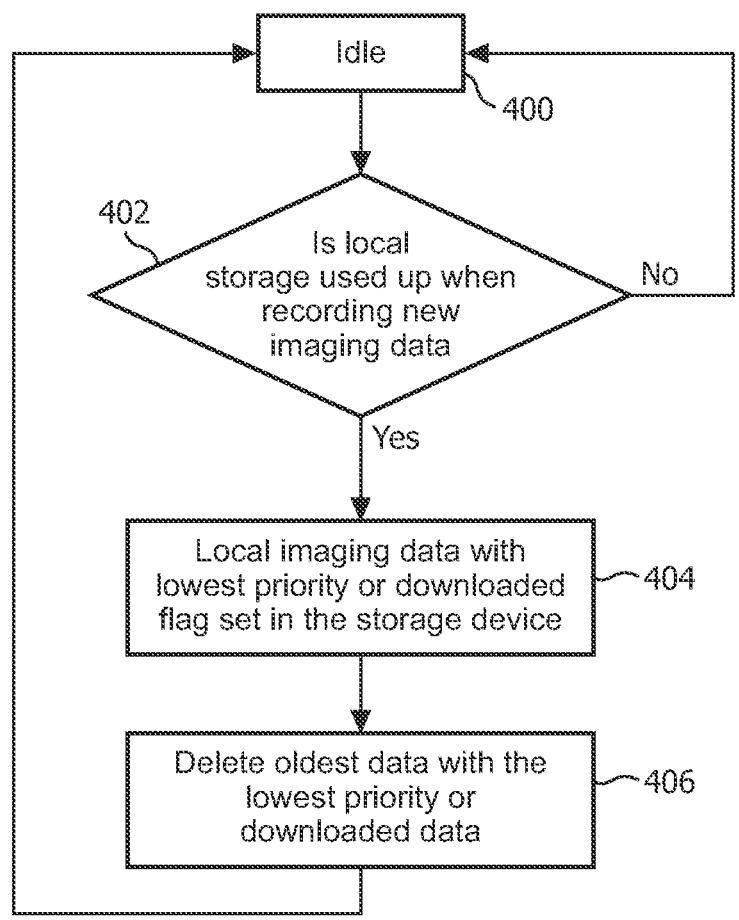
FIG. 4 is a flow chart which illustrates the procedure to manage the imaging data in the storage devices at the lighting units according to an exemplary embodiment of the present invention.

FIG. 4 depicts an exemplary manner in which the storage unit functions. That is, if the storage on a lighting unit is filled as new imaging data is being stored (step 402), the lighting unit deletes old imaging data according to the assigned priority (step 406). The imaging data with lowest priority is deleted first. Within each such priority grouping, the imaging data with the oldest timestamp is the first to be deleted. Furthermore, the imaging data with downloaded status flag is deleted (step 406).

Figure 5:
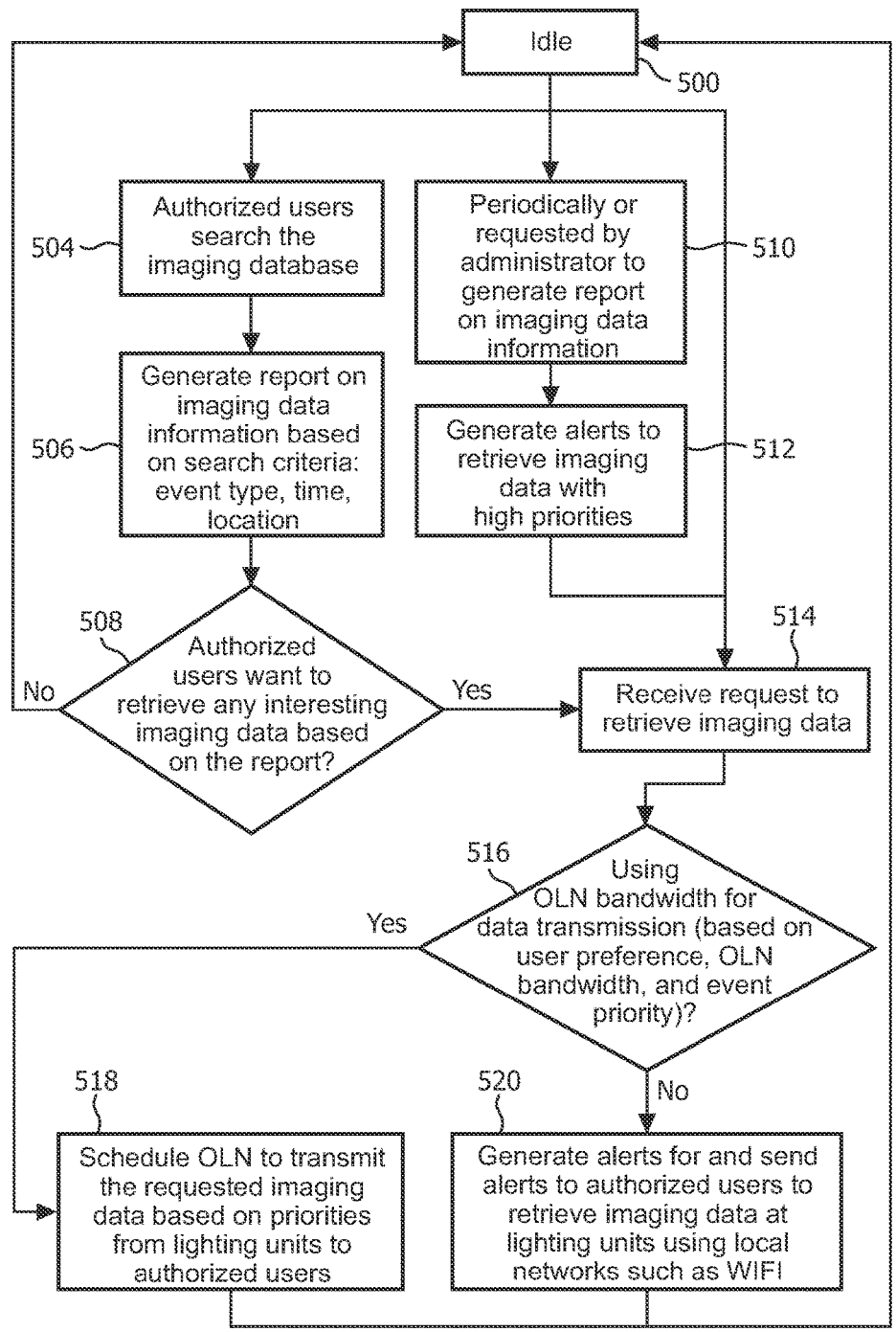
FIG. 5 is a flow chart which illustrates the imaging data retrieval procedure at the lighting manager according to an exemplary embodiment of the present invention.

With the present invention, the lighting manager provides a management and information platform for the imaging data recorded by the sensors at (or near) the lighting units. Potential users of such data include city administrators, police, and emergency responders, etc. In the embodiment of the invention depicted in FIG. 5, the platform can serve as a search platform to search and access imaging data associated with specific events. This could also be provided by using existing/third party search platforms. For example, certain google searches could be directed to the lighting manager data base to conduct a searh. Users can search for imaging data based on type of event (e.g. emergency, traffic accident, crime, etc), time, and location/area information. First, a user request is generated and transmitted to the lighting manager based on the user description of the event (step 506). The lighting manager searches for imaging data in the OLN (system database and/or devices/LUs in the field) that meets the user request criteria.

The lighting manager can also generate a report with imaging data information available at lighting units in the OLN periodically or upon receiving a search request (step 510). It ranks the stored data (at the OLN database and LUs) according to priorities, and sends alerts to retrieve or check the imaging data with high priorities associated with a user request (step 512).

Different methods of retrieving data are contemplated by the invention. By way of examples, one is using OLN bandwidth, and another is going to the lighting units and downloading the data there. Still further, the invention can employ an additional dedicated network between the cameras and the back end system. The user may decide the preferred mode or the light manager may decide (step 516) based on the capabilities of the OLN in delivering the data to the user remotely (e.g. based on available bandwidth).

The lighting manager chooses data with higher priorities which satisfy certain requirements set by authorized users to be transmitted from lighting units to the lighting manager using the OLN bandwidth (step 518). If the OLN bandwidth is not enough due to limited bandwidth or transmission cost to transmit all interesting imaging data, the lighting manager generates requests for authorized users to download the imaging data at locations of lighting poles by using any available communication methods such as WIFI (step 520). To make sure only authorized users can download the imaging data, one way is that the authorized user will get a security key from the lighting manager. In the WiFi case, WiFi is encrypted with such a security key known only to the lighting manager and the authorized users. Other forms of local communication between the users and the lighting units are also possible, e.g. using coded light.

Thus, by way of example, after a car accident occurs, the police send a request to search imaging data for the given location and time. After receiving such a request, the lighting manager searches the OLN imaging database for the given criteria. If the imaging database does not have imaging data information yet for the given time, the lighting manager communicates with lighting units in the given location to obtain the information. If such imaging data is available either in the imaging database or in the storage devices at imaging sensors and lighting units, the lighting manager sends a positive response to the police. The police can then request the lighting manager transmit the imaging data to their communication device(s) or they can go to the lighting units to download the data. The lighting manager may grant the request in the preferred mode or may recommend an alternative based on the available bandwidth.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this disclosure.

Most preferably, the principles of the invention are implemented as any combination of hardware, firmware and software. Moreover, the software is preferably implemented as an application program tangibly embodied on a program storage unit or computer readable storage medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The invention claimed is:

1. An outdoor lighting network (OLN) comprising:
   lighting units equipped with capabilities to communicate with other lighting units in the OLN, said lighting units including,
   an imaging device, the imaging device configured to communicate with at least one of the lighting units;
   a sensor module, the sensor module configured to communicate sensor data to at least one of the lighting units, wherein the sensor module includes an imaging sensor device or multiple different sensor devices, wherein the sensor data relates to an environmental area of a respective lighting unit; and
   a control module configured to record image data from the imaging device of a selected event, only when the selected event is on a list of predetermined selected events that trigger the lighting unit data recording by the imaging device, wherein the selected event is based on sensor data from the sensor module, wherein the control module uses the imaging device data or a combination of multiple different sensor data to identify predetermined events and determine if the identified predetermined events relates to a trigger in the list of predetermined selected events, and assign an event type and a priority to the recorded image data and transmit only the recorded image data of selected events or the selected events of a predetermined priority to a lighting manager, and allow a user to receive portions of the recorded image data of selected events by a different communication method than transmission to the lighting manager.

2. The OLN of claim 1 wherein said sensor module comprises sensor type devices that are selected from the group consisting of occupancy detectors, motion detectors, environmental sensors, alcohol sensors, detectors of signals transmitted from cars, speed detectors, medical alert receivers, temperature sensors, fire alarm signals and combinations thereof.

3. The OLN of claim 1 wherein said different communication method is Wi-Fi.

4. A method to coordinate and control data collection of events from imaging devices controlled through an outdoor lighting network (OLN), said OLN having lighting units and a lighting manager, at least one of the lighting units being in communication with a sensor module wherein the sensor module includes an imaging sensor device or multiple different sensor devices; the method comprising:
   recording image data of a selected event, by one or more of the imaging devices, only when the selected event is is on a list of predetermined selected events that trigger the lighting unit data recoding by the imaging device being detected by the sensor module, and wherein the detection includes using the imaging device data or a combination of multiple sensor data to identify predetermined events and determine if the identified predetermined events relates to a trigger in a list of predetermined events, wherein sensor data from the sensor module relates to an environmental area of a respective lighting unit,
   assigning an event type and a priority to the recorded image data and only transmitting the recorded image data of selected events or the selected events of a predetermined priority to the lighting manager, and allow a user to receive portions of the recorded image data of selected events by a different communication method than transmission to the lighting manager.

5. The method of claim 4 wherein the trigger is selected from a group of predefined events consisting of detected movements by a car and/or a pedestrian, smoke detected by a smoke sensor, the presence of alcohol detected by alcohol sensor, detected signals emanating from cars, speed detection, medical alert signals, environmental sensors, temperature sensors, fire alarms, and combinations thereof.

6. The method of claim 4 further comprising the steps of:
   processing one or more requests from authorized users to control lighting performance and
   controlling lighting performance in accordance with said requests.

7. The method of claim 4 further comprising processing one or more requests from authorized users to record data in emergency situations; wherein said requests are made in response to an ongoing emergency situation.

8. The method of claim 4 further comprising processing requests to neighboring lighting units to obtain data of an abnormal lighting unit to thereby help in diagnostics.

9. The method of claim 4 further comprising controlling imaging sensors in the sensor module to obtain data with low quality/resolution at certain time instants; and to obtain data with higher quality upon the detection of a trigger.

10. The method of claim 4 wherein said recording step further comprises a memory management function which in the event the storage device is at or near capacity as new data is being stored, deletes either downloaded or old imaging data according to the assigned priority.

11. The method of claim 4 further comprising:
providing an information platform where users or other systems can search and access the image data and related information pertaining to specific events.

12. The method of claim 11 further comprising enabling a user to search for imaging data based on type of event, time, and location parameters.

13. The method of claim 11 comprising:
generating a user request to the lighting manager based on the user description of the event; and,
searching by the lighting manager for imaging data in the OLN information database and in the storage devices of one or more lighting units that meets the user request criteria.

14. The method of claim 4 further comprising:
providing by the lighting manager event reports to users based on the image data and related information and according to pre-defined users' interests; and,
processing user requests for more detail pertaining to items contained in the event reports.

15. An outdoor lighting network (OLN) comprising:
lighting units equipped with capabilities to communicate with other lighting units in the OLN, said lighting units including,
an imaging device, the imaging device configured to communicate with at least one of the lighting units;
a sensor module, the sensor module configured to communicate sensor data to at least one of the lighting units, wherein the sensor module includes an imaging sensor device or multiple different sensor devices, wherein the sensor data relates to an environmental area of a respective lighting unit; and
a control module configured to record image data from the imaging device of a selected event, only when the selected event is on a list of predetermined selected events that trigger the lighting unit data recording by the imaging device, wherein the selected event is based on sensor data from the sensor module, wherein the control module uses the imaging device data or a combination of multiple different sensor data to identify predetermined events and determine if the identified predetermined events relates to a trigger in the list of predetermined selected events, and assign an event type and a priority to the recorded image data and transmits information about the recorded image data of selected events to a lighting manager, and allow a user to request portions of the recorded image data of selected events.

* * * * *